US012616932B2

(12) United States Patent　　　　　(10) Patent No.:　US 12,616,932 B2
Boon et al.　　　　　　　　　　　　　(45) Date of Patent:　　　May 5, 2026

(54) DISPLACEMENT PURGE ADSORPTION PROCESS FOR SEPARATING CO₂ FROM ANOTHER GAS

(71) Applicant: Nederlandse Organisatie voor toegepast-natuurwetenschappelijk Onderzoek TNO, s-Gravenhage (NL)

(72) Inventors: Jurriaan Boon, s-Gravenhage (NL); Hendricus Adrianus Johannes van Dijk, s-Gravenhage (NL); Paul Dean Cobden, s-Gravenhage (NL); Jebin Duthie James, s-Gravenhage (NL)

(73) Assignee: Nederlandse Organisatie voor toegepast-natuurwetenschappelijk onderzoek TNO, s-Gravenhage (NL)

( * ) Notice: Subject to any disclaimer, the term of this patent is extended or adjusted under 35 U.S.C. 154(b) by 432 days.

(21) Appl. No.: 18/044,212

(22) PCT Filed: Sep. 13, 2021

(86) PCT No.: PCT/EP2021/075084
　§ 371 (c)(1),
　(2) Date: Mar. 7, 2023

(87) PCT Pub. No.: WO2022/053676
　PCT Pub. Date: Mar. 17, 2022

(65) Prior Publication Data
　US 2023/0311053 A1　　Oct. 5, 2023

(30) Foreign Application Priority Data
　Sep. 11, 2020　(EP) ..................................... 20195772

(51) Int. Cl.
　*B01D 53/04*　　　(2006.01)
　*B01J 20/04*　　　(2006.01)
　(Continued)

(52) U.S. Cl.
　CPC ........ B01D 53/0423 (2013.01); B01J 20/043 (2013.01); B01J 20/3433 (2013.01);
　　(Continued)

(58) Field of Classification Search
　CPC ........... B01D 53/0423; B01D 2253/10; B01D 2257/504; B01D 2259/4009; B01D 53/02;
　　(Continued)

(56) References Cited

U.S. PATENT DOCUMENTS 5,855,650 A * 1/1999 Kalbassi .............. F25J 3/04169
　　　　　　　　　　　　　　　　　　95/120
6,322,612 B1 * 11/2001 Sircar .................. B01D 53/047
　　　　　　　　　　　　　　　　　　95/139
(Continued)

FOREIGN PATENT DOCUMENTS

WO　　WO-2010059055 A1 * 5/2010 ............. B01D 53/02

*Primary Examiner* — Frank M Lawrence, Jr.
(74) *Attorney, Agent, or Firm* — Ipsilon USA—NLO

(57)　　　　　　ABSTRACT

The present invention concerns a process for the separation of a gas mixture containing CO₂ and at least one inert gaseous species, comprising (a) feeding the gas mixture into an adsorption column via a first inlet located at a first side of the column, wherein the adsorption column contains a solid CO₂ sorbent loaded with H₂O molecules and thereby desorbing H₂O molecules and adsorbing CO₂ molecules, to obtain a sorbent loaded with CO₂ and an inert product stream; and then (b) feeding a stripping gas comprising H₂O into the adsorption column via a second inlet located at a second side which is opposite to the first inlet, thereby stripping the sorbent and desorbing CO₂ molecules and adsorbing H₂O molecules, to obtain a sorbent loaded with H₂O and the CO₂ product stream, wherein the adsorption column is re-used in step (a) after being stripped in step (b). The invention also concerns an apparatus for performing the process according to the invention.

10 Claims, 3 Drawing Sheets

(51) Int. Cl.

| | |
|---|---|
| *B01J 20/34* | (2006.01) |
| *C01B 3/00* | (2006.01) |
| *C01B 3/20* | (2006.01) |
| *C01B 3/56* | (2006.01) |
| *C01B 32/50* | (2017.01) |

(52) U.S. Cl.
 CPC ............. *B01J 20/3466* (2013.01); *C01B 3/20* (2013.01); *C01B 3/56* (2013.01); *C01B 32/50* (2017.08); *B01D 2253/10* (2013.01); *B01D 2257/504* (2013.01); *B01D 2259/4009* (2013.01); *C01B 2203/0283* (2013.01); *C01B 2203/042* (2013.01); *C01B 2203/0475* (2013.01); *C01B 2210/0015* (2013.01)

(58) Field of Classification Search
 CPC .... B01D 2253/112; B01D 2259/40086; B01D 2259/402; B01D 2256/16; B01D 53/0454; B01D 53/04; B01J 20/043; B01J 20/3433; B01J 20/3466; C01B 3/20; C01B 3/56; C01B 32/50; C01B 2203/0283; C01B 2203/042; C01B 2203/0475; C01B 2210/0015; C01B 3/508; C10K 3/04; C10K 1/005; Y02P 20/151; Y02C 20/40
 USPC ...... 96/121, 122, 130, 134; 95/139; 423/230
 See application file for complete search history.

(56) References Cited

U.S. PATENT DOCUMENTS

| | | | |
|---|---|---|---|
| 8,530,717 B2 * | 9/2013 | Schubert ................... | C07C 7/12 |
| | | | 95/143 |
| 2002/0110503 A1 | 8/2002 | Gittleman et al. | |
| 2004/0081614 A1 * | 4/2004 | Ying ................... | B01D 53/864 |
| | | | 422/600 |
| 2006/0182680 A1 | 8/2006 | Keefer et al. | |
| 2009/0162268 A1 * | 6/2009 | Hufton .............. | B01D 53/0462 |
| | | | 423/656 |
| 2009/0214902 A1 | 8/2009 | Pelman et al. | |
| 2015/0007727 A1 | 1/2015 | Elliott et al. | |
| 2015/0338098 A1 * | 11/2015 | Boulet ................... | B01D 53/62 |
| | | | 95/98 |
| 2018/0214815 A1 | 8/2018 | Keefer et al. | |

\* cited by examiner

DISPLACEMENT PURGE ADSORPTION PROCESS FOR SEPARATING CO₂ FROM ANOTHER GAS

FIELD OF THE INVENTION

The present invention relates to field of separation of gaseous mixtures, in particular in the context of a sorption-enhanced water gas shift (SEWGS) process.

BACKGROUND ART

Energy-intensive sectors such as steel, refining and chemical industries are still largely dependent on fossil fuels and raw materials, so that it remains important to capture and reuse the released $CO_2$. Unused $CO_2$ can be stored safely, for example in depleted natural gas fields in the North Sea. In the long term, negative $CO_2$ emissions may become the target, which can be obtained by, for example, storing the released $CO_2$ in the use of biomass. The overall reduction in the $CO_2$ emitted into the atmosphere is one of the major challenges in the present-day society, especially for industries where large amounts of carbon atoms remain as side-product, which are typically emitted as $CO_2$.

Sorption-enhanced water-gas shift (SEWGS) has been developed for the conversion of CO to $H_2$ and $CO_2$, allowing the formation of a $CO_2$ product stream and an $H_2$ product stream, wherein $CO_2$ is captured and reused by means of adsorption. This process can be employed to purify the $H_2$ gas in a syngas mixture containing CO and/or $CO_2$, to obtain a $H_2$ product stream and a by-product stream wherein the incoming carbon atoms are captured in a $CO_2$ stream. The $CO_2$ product stream may then be subjected to $CO_2$ storage and as such eliminate $CO_2$ emissions into the atmosphere. Removal and subsequent storage of $CO_2$ from other gases can be accomplished in similar fashion.

WO 2010/059055 (EP 2362848) discloses a water gas shift process with a reaction stage, wherein the reaction stage comprises (a) providing a gas mixture comprising CO, $H_2O$ and an acid gas component to a reactor containing an adsorbent, and (b) subjecting the gas mixture to water gas shift reaction conditions to perform the water gas shift reaction. The adsorbent used in WO 2010/059055 comprises an alkali promoted hydrotalcite material, and the acid gas component comprises $H_2S$.

WO 2013/122467 (EP 2814775) discloses that the high-pressure steam supply in a hydrogen production process can be made more efficient by a water gas shift process which comprises, in alternating sequence (i) a reaction stage wherein a feed gas comprising CO and $H_2O$ is fed into a water gas shift reactor containing a sorbent material capable of adsorbing $H_2O$ and $CO_2$ and wherein a product gas issuing from the reactor is collected, (ii) a regeneration stage wherein $CO_2$ is removed from the reactor, (iii) a loading stage, wherein $H_2O$ is fed into the reactor, wherein said feed gas mixture has a molar ratio of $H_2O$ to CO below 1.2, and the loading stage is performed at a lower pressure than the pressure of the reaction stage.

WO 2004/076017 discloses adsorptive gas separation for high-temperature fuel cell applications, and regeneration of adsorbent materials, via (rotary) pressure-swing adsorption (PSA), displacement purge, thermal swing, or combinations thereof. WO 2004/076017 specifically also discloses a hydrogen-enrichment rotary adsorption module with displacement purge regeneration, and solid oxide fuel cell power plants including a water gas shift reactor with typical exit temperatures in the range of about 200° C. to about 400°

C. WO 2004/076017 further specifically discloses that in a molten-carbonate high-temperature fuel cell (MCFC), an enrichment of anode exhaust gas in hydrogen can be done via a displacement purge adsorption process, for recycle to the anode inlet, with the benefit that the purge desorption gas stream enriched in carbon dioxide may be recycled to the cathode inlet to increase the concentration of carbon dioxide in the cathode inlet gas relative to that of air, as opposed to discharge into the atmosphere (page 17, lines 13-18).

WO 2006/133576 discloses adsorptive gas bulk separation systems in which a feed gas source, typically comprising at least one fuel gas component and at least one diluent, is separated through a displacement purge adsorptive separator apparatus with an adsorbent bed, further using a purge gas source for purge regeneration of the adsorbent bed. The displacement purge adsorptive separator apparatus adsorbs at least a portion of the at least one diluent component from the feed gas stream to produce an upgraded gas. WO 2006/133576 further discloses that pretreated blast furnace gas may be passed through a conventional water gas shift module to convert at least a portion of the carbon monoxide fuel gas in the pretreated blast furnace gas stream into hydrogen fuel gas via the water gas shift reaction. The resulting blast furnace feed gas stream comprises at least a hydrogen fuel gas component and a diluent gas component, such as $CO_2$ and/or $N_2$, and may be supplied to displacement purge bulk separator for adsorption of at least a portion of the diluent gas component on suitable adsorbent materials in adsorbent beds in order to produce an upgraded fuel gas product for downstream use, or for downstream further purification, such as by purification PSA. Following adsorption of diluent component in adsorbent beds, the diluent component may be substantially desorbed by means of displacement purge using purge gas to produce purge exhaust gas which is then either disposed or utilised for other purposes.

There remains a general need for a process to separate inert gaseous species such as $H_2$ from $CO_2$, in particular in the context of a SEWGS process, which obviates the need for energy-intensive steps, for improving the operational economy, sustainable use of resources and overall cost. The process according to the invention provides in this need.

SUMMARY OF THE INVENTION

The inventors have developed a process wherein a gas mixture comprising $CO_2$ and at least one inert (i.e. non-adsorbing) gaseous species, such as $H_2$ or $N_2$, can be efficiently separated into a $CO_2$ product stream and an inert gas product stream. The process according to the invention can operate under isobaric and isothermic conditions, meaning that no pressure or temperature swings need to be applied. The process according to the invention comprises:

(a) feeding the gas mixture into an adsorption column via a first inlet located at a first side of the column, wherein the adsorption column contains a solid $CO_2$ sorbent loaded with $H_2O$ molecules, thereby desorbing $H_2O$ molecules and adsorbing $CO_2$ molecules, to obtain a sorbent loaded with $CO_2$ and the inert product stream; and then (b) feeding a stripping gas comprising $H_2O$ into the adsorption column via a second inlet located at a second side which is opposite to the first side, thereby stripping the sorbent and desorbing $CO_2$ molecules and adsorbing $H_2O$ molecules, to obtain a sorbent loaded with $H_2O$ and the $CO_2$ product stream, wherein the adsorption column is re-used in step (a) after being stripped in step (b).

In a second aspect, the invention concerns an apparatus for the separation of a $CO_2$ product stream and an inert (i.e. non-adsorbing) gas product stream, comprising a first adsorption column and a second adsorption column, wherein:

(i) the first adsorption column comprises a first inlet and a second outlet located on one side of the column and a first outlet and second inlet located at the opposite side of the column, and a solid $CO_2$ sorbent, and (ii) the second adsorption column comprises a first inlet and a second outlet located on one side of the column and a first outlet and second inlet located at the opposite side of the column, and a solid $CO_2$ sorbent, wherein both adsorption columns are configured in a first phase to receive a gas mixture comprising $CO_2$ and the inert species via the first inlet and to discharge an inert product stream via the first outlet, and in a second phase to receive a stripping gas comprising $H_2O$ via the second inlet and to discharge a $CO_2$ product stream via the second outlet, wherein the apparatus is configured such that one adsorption column operates in the first phase while the other adsorption column operates in the second phase, and further comprises means for simultaneous switching both adsorption columns between the first and second phase.

BRIEF DESCRIPTION OF THE DRAWINGS

The present invention will be discussed in more detail below, with reference to the attached drawings, in which.

DETAILED DESCRIPTION

Figure 1:
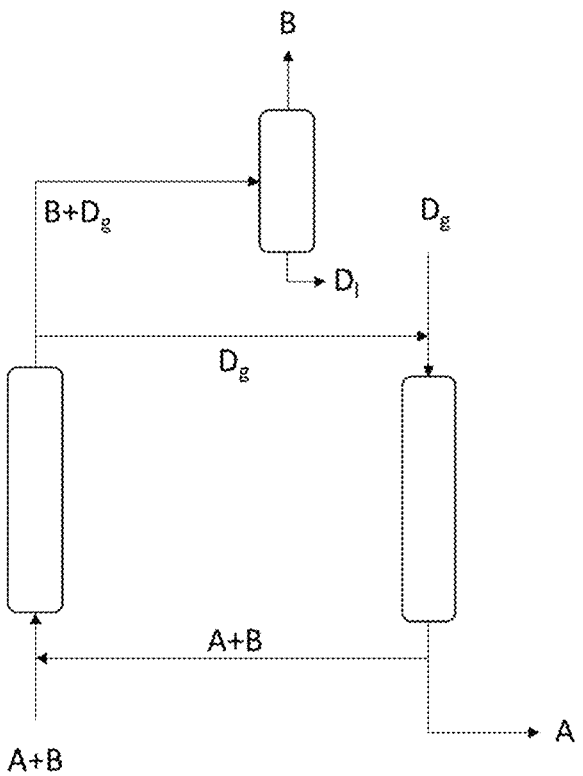
FIG. 1 depicts the flow diagram of a preferred embodiment of the process according to the invention, wherein the respective streams indicate $CO_2$ (A), inert gases, such as $H_2$ and/or $N_2$ and possibly other inert gases (B), steam ($D_g$), and water ($D_l$).

The inventors have developed a process wherein a gas mixture comprising $CO_2$ and $H_2$ can be efficiently separated into a $CO_2$ product stream and a $H_2$ product stream. The process according to the invention is equally applicable to other inert gaseous species to be separated from $CO_2$. The process according to the invention can operate under isobaric and isothermic conditions, meaning that no pressure or temperature swings need to be applied. The process according to the invention employs an adsorption column containing a solid $CO_2$ sorbent, which is capable of adsorbing $CO_2$ and $H_2O$ molecules. In one step (step (a)), $CO_2$ is adsorbed and $H_2O$ is desorbed by a displacement purge, and in the other step (step (b)), $H_2O$ is adsorbed and $CO_2$ is desorbed by a displacement purge. Other gases which may be part of the gas mixture, such as e.g. $H_2$ and $N_2$, are referred to as "inert gases" because they do not adsorb to the adsorption column. While the process according to the invention utilizes a principle resembling displacement purge adsorption (DPA), it operates much more efficiently, by performing two displacement purges within the same adsorption column and by obviating the need for energy-intensive distillation steps which are normally required for the recuperation of one of the displacing agents. Conventional displacement purge adsorption process is known from for example WO 2004/076017 and WO 2006/133576.

The process according to the invention provides an elegant and cost- and energy-efficient process for the separation of inert gases such as $H_2$ from $CO_2$, which normally requires energy-intensive steps such as temperature swing adsorption, pressure swing adsorption or distillation. Further, the present process allows for an elegant integration of a displacement purge adsorption in a sorption-enhanced water gas shift (SEWGS) process, providing for the formation of a $CO_2$ product stream and an inert product stream of high purity. A further advantage of the process according to the invention is that step (a) allows for adsorption of $CO_2$ at relatively low partial pressures to the sorbent of the adsorption column, while step (b) allows for displacing and concentrating the $CO_2$ at a higher partial pressure and higher purity from the sorbent of the adsorption column, during the formation of the $CO_2$ product stream.

In a first aspect, the invention concerns a process for the separation of a gas mixture containing $CO_2$ and at least one inert (i.e. non-adsorbing) gaseous species into a $CO_2$ product stream and an inert gas product stream:

(a) feeding the gas mixture into an adsorption column via a first inlet located at a first side of the column, wherein the adsorption column contains a solid $CO_2$ sorbent loaded with $H_2O$ molecules and thereby desorbing $H_2O$ molecules and adsorbing $CO_2$ molecules, to obtain a sorbent loaded with $CO_2$ and the inert gas product stream; and then (b) feeding a stripping gas comprising $H_2O$ into the adsorption column via a second inlet located at a second side which is opposite to the first inlet, thereby stripping the sorbent and desorbing $CO_2$ molecules and adsorbing $H_2O$ molecules, to obtain a sorbent loaded with $H_2O$ and the $CO_2$ product stream, wherein the adsorption column is re-used in step (a) after being stripped in step (b).

In a second aspect, the invention concerns an apparatus for the separation of a $CO_2$ product stream and an inert (i.e. non-adsorbing) product stream, comprising a first adsorption column and a second adsorption column, wherein:

(i) the first adsorption column comprises a first inlet and a second outlet located on one side of the column and a first outlet and second inlet located at the opposite side of the column, and a solid $CO_2$ sorbent, and (ii) the second adsorption column comprises a first inlet and a second outlet located on one side of the column and a first outlet and second inlet located at the opposite side of the column, and a solid $CO_2$ sorbent, wherein both adsorption columns are configured in a first phase to receive a gas mixture comprising $CO_2$ and the inert species via the first inlet and to discharge an inert product stream via the first outlet, and in a second phase to receive a stripping gas comprising $H_2O$ via the second inlet and to discharge a $CO_2$ product stream via the second outlet, wherein the apparatus is configured such that one adsorption column operates in the first phase while the other adsorption column operates in the second phase, and further comprises means for simultaneous switching both adsorption columns between the first and second phase.

The invention provides a process for separating a gas mixture containing $CO_2$ and an inert species into an inert product stream and a $CO_2$ product stream, and an apparatus for performing the process according to the invention. Everything defined here below for the process according to the invention equally applies to the apparatus according to the invention, and everything defined for the apparatus according to the invention equally applies to the process according to the invention.

Step (a)

In step (a), the gas mixture (also referred to as the feed) is fed into an adsorption column via a first inlet located at a first side of the column. The inlet is typically located at the bottom of the column, but may also be located at the top of the column. The column further contains a first outlet located opposite to the first inlet. The adsorption column contains a solid $CO_2$ sorbent, which is capable of adsorbing $CO_2$ molecules, but is at the beginning of step (a) loaded with $H_2O$ molecules. During step (a), the sorbed $H_2O$ molecules are desorbed and $CO_2$ molecules are adsorbed, while the inert molecules of the incoming gas mixture remain in the gaseous phase and travel through the sorbent towards the first outlet without being adsorbed. Thus, step (a) affords a sorbent loaded with $CO_2$ molecules and a tail gas containing the inert molecules, which forms the inert product stream, optionally after separation of $H_2O$ molecules.

During step (a), a front moves through the adsorption column. The front separates two states of the sorbent, a first phase at the side of the first inlet where the sorbent contains adsorbed $CO_2$ molecules, preferably is loaded with $CO_2$ molecules, and a second phase at the other side, i.e. the side of the first outlet, where the sorbent is still loaded with $H_2O$ molecules. At the front, $CO_2$ molecules are adsorbed and $H_2O$ molecules are desorbed. The desorbed $H_2O$ molecules move through the column towards the first outlet. Such exchange is driven by the large partial pressure of $CO_2$ molecules in the gas phase while gaseous $H_2O$ molecules are virtually absent. The present invention advantageously offers a sharp front, by which the two phases of the sorbent are separated. Emerging from the first outlet during step (a) is a tail gas comprising non-adsorbed inert gaseous molecules, together with desorbed $H_2O$ molecules and any other gaseous component that is present in the feed and not adsorbed in the column.

In case step (a) would continue endlessly, at some point the sorbent is fully loaded with $CO_2$ molecules, even the sorbent closest to the first outlet, and no further $CO_2$ molecules would be adsorbed. Gaseous $CO_2$ would then emit from the first outlet and end up in the tail gas of step (a). In other words, the front reaches the end of the reactor and break-through of $CO_2$ is observed. However, in the present process step (a) is halted and the feed at the first inlet is stopped, meaning that no tail gas will emerge from the first outlet. At this moment, the process switches to step (b). The moment at which this switch is made, is preferably determined by the location of the front within the adsorption column. The skilled artisan is aware of known means to detect the front, such as e.g. direct detection via in-situ composition analysis of the effluent, or via monitoring the temperature front within the adsorption column. Although the process is essentially isothermal, because of differences in the binding enthalpies between $CO_2$ and $H_2O$, small temperature fronts are observed and can be detected. In the latter case, typically the temperature front is first estimated via modelling the process and later refined by fine-tuning the cycle in operation. In case two or more adsorption columns are configured in a first phase to receive a gas mixture comprising $CO_2$ via the first inlet and to discharge an inert product stream via the first outlet, and in a second phase to receive a stripping gas comprising $H_2O$ via the second inlet and to discharge a $CO_2$ product stream via the second outlet, wherein the apparatus is configured such that one adsorption column operates in the first phase while the other adsorption column operates in the second phase, and further comprises means for simultaneous switching both adsorption columns between the first and second phase, the entire process cycle needs to be designed accordingly and can e.g. be steered via the output obtained from the gas mixtures fed into the process or the apparatus.

At the beginning of step (a), the gaseous volume of the adsorption column may still contain gaseous components that are fed during step (b), including $H_2O$ molecules. In order to increase the purity of the inert product stream, such as the $H_2$ product stream, and reduce the need for downstream separation of $H_2O$ molecules, it is preferred that at the beginning of step (a), when this gaseous volume is emitted via the first outlet, the tail gas does not form the inert product stream yet, but is instead collected separately. The volume of separately collected tail gas is preferably about the same as one adsorption column gas volume. Preferably, the separately collected gas volume at the beginning of step (a) is introduced into the adsorption column during step (b), as part of the stripping gas.

The skilled person is aware and understands that the process according to the invention can be run at varying though suitable temperatures and pressures, wherein the temperature is in the range of 200 to 500° C., more preferably between 300 and 400° C., and wherein the pressure is between 1 and 50 bar, more preferably between 2 and 40 bar, yet more preferably between 5 and 30 bar, most preferably between 10 and 20 bar. In an especially preferred embodiment, the temperature is in the range of 300-500° C., more preferably in the range of 325-500° C., more preferably in the range of 350-450° C., most preferably in the range of 350-400° C. Preferably, the temperature ranges of this preferred embodiment are combined with a pressure in the range of 1-50 bar, more preferably in the range of 2-40 bar, yet more preferably in the range of 5-30 bar, most preferably in the range of 10-20 bar. These temperatures and pressures are especially suitable for the separation of a product stream originating from a water gas shift (WGS) process, preferably a sorption-enhanced water gas shift (SEWGS) process, as further defined below. As such, the conditions in the (SE) WGS reactor are nicely aligned with the conditions in the $CO_2$ separation column, which allows energy efficient implementation of the present process in (SE)WGS reactor to obtain pure streams of $CO_2$ and $H_2$.

The tail gas of step (a) forms the product stream, containing inert species and desorbed $H_2O$ molecules. For example, the product stream comprises $H_2$ and/or $N_2$, and optionally any further inert gases that are present in the feed and defined elsewhere. The amount of steam is variable, and is typically in the range of 50% up to close to 100%. At the beginning of step (a), the steam content may be higher, such as above 80%, while later it may drop to 60% or lower. The product stream may be subjected to further purification, such as removal of the desorbed $H_2O$ molecules. For example, a condensation step could advantageously remove these molecules. Such a condensation step to remove $H_2O$ molecules from gaseous components is well-known in the art, and can be performed in any suitable way. This is especially preferred to obtain a pure $H_2$ product stream.

Alternatively, the inert product stream is used as such, without further purification. For example, a mixture of $H_2$ and $H_2O$ may also find applications in combustion processes. Steam can be advantageously added to a dry syngas. An advantage is that steam dilution of $H_2$ allows control of the $NO_x$ emissions as shown by Chiesa P, Lozza G & Mazzocchi L (2005), Using hydrogen as gas turbine fuel, *J. Eng. Gas Turbines Power* 127(1), 73-80; and Göke S, Füri M, Bourque G, Bobusch B, Göckeler K, Krüger O et al. (2013), Influence of steam dilution on the combustion of natural gas and hydrogen in premixed and rich-quench-lean combustors, *Fuel processing technology* 107, 14-22. A further advantage is that steam dilution of $H_2$ also allows to lower the reactivity of hydrogen, because already a relatively low steam content prevents flashback, and thus reduces the risk of explosion.

The feed is a mixture comprising $CO_2$ molecules and at least one inert species that is not adsorbed by the sorbent. Typically inert species include $H_2$, $N_2$, $CH_4$ and other carbohydrates. In one embodiment, the inert species include $H_2$ and/or $N_2$, preferably the inert species include at least $H_2$. In an especially preferred embodiment, the inert species is $H_2$ and the process is for separating a gas mixture containing $CO_2$ and $H_2$ into a $CO_2$ product stream and an $H_2$ product stream.

The feed of the adsorption column in step (a) is preferably a gaseous mixture containing $CO_2$ and $H_2$ molecules. Separation of these components is often desired, as $H_2$ is a valuable gas that can be used in a plethora of applications. $CO_2$ on the other hand is one of the major waste gases that contributes to global warming, and its emission into the environment should be prevented as much as possible. Nowadays, there are many initiatives to store $CO_2$, e.g. below the earth surface, which processes require a concentrated, preferably pure, stream of $CO_2$. The present invention provides such a concentrated $CO_2$ stream suitable for conventional storage facilities.

The feed may contain a mixture of inert gaseous components, such as $H_2$, $N_2$, Ar, $H_2S$ and CO. Some $H_2O$ may also be present, but preferably to a limited extent. In other words, the feed during step (a) is preferably fairly dry, i.e. the $CO_2/H_2O$ ratio is typically high in order to efficiently use the separation characteristics of the sorbent material. The allowable water content can be determined based on the adsorption equilibrium during isothermal conditions. The skilled person understands to adjust the working capacity for $CO_2$ and $H_2O$ in order to be in the same range, if needed.

In a preferred embodiment, the feed originates from a water gas shift process, wherein CO and $H_2O$ are converted into $CO_2$ and $H_2$. It is especially preferred that the water-gas shift reaction is part of the process according to the invention. Herein, the process according to the invention can also be referred to as for the formation of a $CO_2$ product stream and an $H_2$ product stream, wherein a gaseous mixture comprising CO and $H_2O$ is subjected to a water-gas shift reaction, and the resulting gas is separated into a $CO_2$ product stream and an $H_2$ product stream via steps (a) and (b) defined herein.

The water-gas shift reaction can be performed in any way known in the art. Preferably, the water-gas shift reaction is sorption-enhanced (SEWGS). In a preferred embodiment, the SEWGS process is carried out as described in WO 2010/059055 (EP 2362848) which discloses a water gas shift process with a reaction stage, wherein the reaction stage comprises subjecting a gas mixture comprising CO, $H_2O$ and an acid gas component in a reactor containing an adsorbent to water gas shift reaction conditions to perform the water gas shift reaction. The respective contents of WO 2010/059055 (EP 2362848) are herein incorporated by reference. In a further preferred embodiment, the SEWGS process is carried out as described in WO 2013/122467 (EP 2814775) which comprises, in alternating sequence (i) a reaction stage wherein a feed gas comprising CO and $H_2O$ is fed into a water gas shift reactor containing a sorbent material capable of adsorbing $H_2O$ and $CO_2$ and wherein a product gas issuing from the reactor is collected, (ii) a regeneration stage wherein $CO_2$ is removed from the reactor, (iii) a loading stage, wherein $H_2O$ is fed into the reactor, wherein said feed gas mixture has a molar ratio of $H_2O$ to CO below 1.2, and the loading stage is performed at a lower pressure than the pressure of the reaction stage. The respective contents of WO 2013/122467 (EP 2814775) are herein incorporated by reference.

Step (b)

In step (b), the adsorption column is fed with a stripping gas via a second inlet located at the opposite side of the column with respect to the first inlet. Thus, the second inlet is located at the same side as the first outlet. Preferably, the second inlet and the first outlet are the same structural element, and a valve determines whether it is used as outlet during step (a) or as inlet during step (b). Typically, the second inlet is located at the top of the column, but may also be located at the bottom of the column. The column further contains a second outlet located opposite to the second inlet, i.e. at the same side of the first inlet. Preferably, the second outlet and the first inlet are the same structural element, and a valve determines whether it is used as inlet during step (a) or as outlet during step (b).

At the beginning of step (b), the adsorption column contains a sorbent loaded with $CO_2$ molecules. During step (b), a stripping gas comprising $H_2O$ molecules is led through the sorbent, thereby stripping the sorbent and desorbing $CO_2$ molecules and adsorbing $H_2O$ molecules. Thus, step (b) affords a sorbent loaded with $H_2O$ molecules and a tail gas containing $CO_2$ molecules, which forms the $CO_2$ product stream. All components are in the gas phase in the context of the present invention. Thus, the stripping gas may also be referred to as containing steam.

During step (b), a front moves through the adsorption column. The front separates two states of the sorbent, a first phase at the side of the second inlet where the sorbent contains adsorbed $H_2O$ molecules, preferably is loaded with $H_2O$ molecules, and a second phase at the other side, i.e. the side of the second outlet, where the sorbent is still loaded with $CO_2$ molecules. At the front, $H_2O$ molecules are adsorbed and $CO_2$ molecules are desorbed. The desorbed $CO_2$ molecules move through the column towards the second outlet. Such exchange is driven by the large partial pressure of $H_2O$ molecules in the gas phase while gaseous $CO_2$ molecules are virtually absent. The present invention advantageously offers a sharp front, by which the two phases of the sorbent are separated. Emerging from the second outlet during step (b) is a tail gas of high purity comprising desorbed $CO_2$ molecules. Advantageously, the front of desorbed $CO_2$ molecules can be reused directly and does not require further (intermediate) separation.

In case step (b) would continue endlessly, at some point the sorbent is fully loaded with $H_2O$ molecules, even the sorbent closest to the second outlet, and no further $H_2O$ molecules would be adsorbed and no $CO_2$ molecules would remain that would be desorbed. Gaseous $H_2O$ would then emit from the second outlet and end up in the tail gas of step (b). In other words, the front reaches the end of the reactor and break-through of $H_2O$ is observed. However, in the present process, step (b) is halted and the feed of the stripping gas at the second inlet is stopped, meaning that no tail gas will emerge from the second outlet. At this moment, the process switches back to step (a). The moment at which this switch is made, is preferably determined by the location of the front within the adsorption column. The skilled artisan is aware of known means to detect the front, such as e.g. direct detection via in-situ composition analysis of the effluent, or via monitoring the temperature front within the adsorption column. In the latter case, typically the temperature front is first estimated via modelling the process and later refined by fine-tuning the cycle in operation. In case two or more adsorption columns are configured in a first phase to receive a gas mixture comprising $CO_2$ via the first inlet and to discharge an inert product stream via the first outlet, and in a second phase to receive a stripping gas comprising $H_2O$ via the second inlet and to discharge a $CO_2$ product stream via the second outlet, wherein the apparatus is configured such that one adsorption column operates in the first phase while the other adsorption column operates in the second phase, and further comprises means for simultaneous switching both adsorption columns between the first and second phase, the entire process cycle needs to be designed accordingly and can e.g. be steered via the output obtained from the gas mixtures fed into the process or the apparatus.

At the beginning of step (b), the gaseous volume of the adsorption column may still contain gaseous components that are fed during step (a), including the inert gaseous molecules. In order to increase the separation between the inert species such as $H_2$ and $CO_2$, it is preferred that at the beginning of step (b), when this gaseous volume is emitted via the second outlet, the tail gas does not form the $CO_2$ product stream yet, but is instead collected separately and recycled to the feed of step (a). The volume of separately collected tail gas is preferably about the same as one adsorption column gas volume. Preferably, the separately collected gas volume at the beginning of step (b) is introduced into the adsorption column during step (a), together with the feed.

The skilled person is aware and understands that the process according to the invention can be run at varying though suitable temperatures and pressures, wherein the temperature is in the range of 200 to 500° C., more preferably between 300 and 400° C., and wherein the pressure is between 1 and 50 bar, more preferably between 2 and 40 bar, yet more preferably between 5 and 30 bar, most preferably between 10 and 20 bar.

Step (b) affords the $CO_2$ product stream. In view of the sharp front that moves through the column during step (b), the $CO_2$ product stream is substantially pure, and suitable for $CO_2$ storage without further purification. Alternatively, the $CO_2$ product stream can be used for downstream processing, such as in the production of urea, for example such as disclosed in WO 2020/025815.

The process according to the invention does not require a pressure swing adsorption or a temperature swing adsorption in order to provide excellent separation of $H_2$ and $CO_2$. Instead, the process employs the roll-up effect which specifically occurs in step (b), and to a lesser extent in step (a) in which steam is desorbed in a more dispersive fashion. The "roll-up" effect relies on similar adsorption characteristics of $CO_2$ and $H_2O$ onto the sorbent of the adsorption column.

Specifically, potassium promoted hydrotalcites (K-HTCs) can be used as sorbent in the context of the present invention, which have a stronger affinity towards $H_2O$ than $CO_2$, allowing the formation of a $CO_2$ front. The roll-up effect can be understood as follows: Provided that an adsorption column is preloaded with steam, feeding a gas mixture allows adsorption of $CO_2$ at relatively low partial pressures to the sorbent of the adsorption column. During the initial phase of the feed step, $H_2O$ molecules bound to the sorbent will be desorbed from the adsorption column. Furthermore, as a result of the adsorption of $CO_2$ to the sorbent of the adsorption column, an inert product stream is formed which can be separately collected. Advantageously, the released $H_2O$ molecules during the initial phase of step (a) can be used in step (b), wherein the adsorption column is purged with steam, thereby forming the $CO_2$ product stream, which can be understood as displacing and concentrating the $CO_2$ at a higher partial pressure and higher purity.

The process according to the invention preferably does not require a pressure swing adsorption or a temperature swing adsorption. Additionally or alternatively, the process according to the invention is preferably isobaric and isothermic. Typically, steps (a) and (b) are performed at a pressure between in the range of 1-25 bar, and at a temperature in the range of 200-500° C., wherein the pressure during the process varies for at most 1 bar, preferably at most 0.5 bar, and the temperature during the process varies for at most 40° C., preferably at most 25° C. In a preferred embodiment of the process according to the invention, the pressure during the process varies for at most 0.3 bar, more preferably at most 0.1 bar, and/or the temperature during the process varies for at most 10° C., more preferably at most 5° C. Advantageously, in a preferred embodiment, the process does not require any temperature changes nor any pressure changes, and thus operates within relatively narrow pressure margins and within relatively narrow temperature margins. Any possible temperature changes and/or pressure changes may originate from e.g. thermodynamic effects of adsorption of components from the gas mixture to the sorbent of the one or more adsorption columns.

A further advantage of the process according to the invention is that no distillation step is required. In a preferred embodiment, the process according to the invention is carried out with the proviso that no distillation step is applied. This provides a marked advantage over conventional displacement purge adsorption processes, which require distillation steps in order to separate component mixtures that leave the adsorption column via additional distillation stages. In conventional processes distillation is used for the recuperation of a displacement agent which can be a specialty chemical in several applications. The process according to the invention does not require intermediate purification and is thereby advantageous by avoiding the energy-intensive steps, such as pressure swing adsorption, temperature swing adsorption and distillation, which are typically part of conventional processes to separate $H_2$ from $CO_2$, e.g. for the regeneration of sorbent materials.

The process according to the invention is performed in a adsorption column, which is further defined below. The process is cyclic, in that the same adsorption column, after being used in step (a), is used in step (b), and after being used in step (b), is used in step (a).

Apparatus

The process according to the invention is performed within an adsorption column. The invention also pertains to the apparatus, containing at least two of such adsorption columns. The apparatus according to the invention may also be referred to as system or reactor, and is configured for performing the process according to the invention. The apparatus contains at least two adsorption columns which are capable of operating in parallel, wherein the design is such that at least one column is capable of performing step (a), also referred to as the first phase or the adsorption phase, while simultaneously at least one column is capable of performing step (b), also referred to as the second phase or the purge phase.

A single adsorption column according to the invention contains two inlets, a first inlet located at one side and a second inlet located at the opposite side of the column. The adsorption column according to the invention also contains two outlets, a first outlet located opposite to the first inlet, and a second outlet located opposite to the second inlet. Thus, the second inlet is located at the same side as the first outlet. Preferably, the second inlet and the first outlet are the same structural element, and a valve determines whether it is used as outlet during step (a) or as inlet during step (b). The column further contains a second outlet located opposite to the second inlet, i.e. at the same side of the first inlet. Preferably, the second outlet and the first inlet are the same structural element, and a valve determines whether it is used as inlet during step (a) or as outlet during step (b). In a preferred embodiment, the column is an upright (vertically or axially oriented) column. Typically, the first outlet and the second inlet are located at the top of the column, and the first inlet and the second outlet are located at the bottom of the column, but this may also be the other way around.

In a preferred embodiment, each absorption column comprises means to measure the temperature along the length (or height for an upright column) of the column. Such means are known to the skilled person, and may include thermocouples. The apparatus according to the invention advantageously comprise a control system, wherein the measured temperature is used as input to determine when an absorption column shifts from the first phase to the second phase or from the second phase to the first phase. Preferably, the control system operates two valves simultaneously, the valve that switches the first inlet to the second outlet (or vice versa) and the valve that switches the first outlet to the second inlet (or vice versa). Such switch would shift an absorption column from the first phase to the second phase (or vice versa).

The adsorption column contains a solid $CO_2$ sorbent, which is capable of adsorbing $CO_2$ and $H_2O$. The sorbent may also be referred to as a solid $CO_2$ and $H_2O$ sorbent. Such sorbents are known in the art, and any known type may be employed in the context of the present invention. The term sorbent may also indicate a combination of two or more sorbents. Preferred sorbents are selected from the group consisting of alumina, hydrotalcites and molecular sieves. The alumina or hydrotalcite is preferably alkali-promoted. In an especially preferred embodiment, the sorbent is an alkali-promoted hydrotalcite material, especially potassium promoted hydrotalcite, as disclosed e.g. in WO 2010/059055. In a further preferred embodiment, the sorbent is a molecular sieve material, including natural and synthetic zeolites and titanium based materials, activated carbons, carbon molecular sieves, alumina- and/or silica-based materials, and functional-impregnated adsorbent materials, such as amine-impregnated adsorbents as disclosed in WO 2006/133576. The inventors have obtained optimal results with potassium promoted hydrotalcite, especially in terms of the sharpness of the front that moves through the column on step (a) and step (b). Furthermore, hydrotalcites are still functional at the preferred elevated temperatures of 300° C. or even higher, which are preferred for the present process as explained above. At such temperatures, other sorbents such as alumina may break-down or exhibit a significant loss in adsorption capacity at these temperatures.

The apparatus according to the invention is for the separation of a $CO_2$ product stream and an inert product stream, and comprises a first adsorption column and a second adsorption column, wherein:

(i) the first adsorption column comprises a first inlet and a second outlet located on one side of the column and a first outlet and second inlet located at the opposite side of the column, and a solid $CO_2$ sorbent, and (ii) the second adsorption column comprises a first inlet and a second outlet located on one side of the column and a first outlet and second inlet located at the opposite side of the column, and a solid $CO_2$ sorbent, wherein both adsorption columns are configured in a first phase to receive a gas mixture comprising $CO_2$ via the first inlet and to discharge an inert product stream via the first outlet, and in a second phase to receive a stripping gas comprising $H_2O$ via the second inlet and to discharge a $CO_2$ product stream via the second outlet, wherein the apparatus is configured such that one adsorption column operates in the first phase while the other adsorption column operates in the second phase, and further comprises means for simultaneous switching both adsorption columns between the first and second phase.

The apparatus according to the invention is simplified with respect to apparatuses for the separation of a $CO_2$ product stream and an inert product stream known in the art. It is advantageous that the apparatus according to the invention does not require any means for pressure exchange thereby reducing material investment. Furthermore, the apparatus according to the invention enables a more energy-efficient separation of a $CO_2$ product stream and an inert product stream.

In the context of the present invention, the first inlet and second outlet may be same structural element, which is in the first phase configured as an inlet and by virtue of a valve switched to an outlet during the second phase. Likewise, the second inlet and first outlet may be same structural element, which is in the first phase configured as an outlet and by virtue of a valve switched to an inlet during the second phase. As such, during the first phase a gaseous feed mixture would be fed to the column via the first inlet and via that same inlet, now acting as an outlet, the $CO_2$ product stream would be discharged from the column.

In a preferred embodiment, the apparatus according to the invention contains no distillation module. In a further preferred embodiment, the apparatus according to the invention contains no means for pressure-swing adsorption. In yet a further preferred embodiment, the apparatus according to the invention contains no means for temperature-swing adsorption. It is especially preferred that the apparatus according to the invention contains no distillation module, no means for pressure-swing adsorption and no means for temperature-swing adsorption.

EXAMPLES

Packed-Bed and Intraparticle Model

The isotherm SEWGS model developed by Boon et al. (Boon, J., Cobden, P. D., Van Dijk, H. A. J., Hoogland, C., van Selow, E. V., & van Sint Annaland, M. (2014), Isotherm model for high-temperature, high-pressure adsorption of $CO_2$ and $H_2O$ on K-promoted hydrotalcite, *Chemical Engi-*

*neering Journal*, 248, 406-414.) was used to describe the transport phenomena in the packed-bed column and adsorption of $CO_2$ as $H_2O$ (Tables 1 and 2). The double adsorption isotherms for $CO_2$ and $H_2O$ in Boon's model consisted of both surface as nanopores contributions. However, the sorption mechanism proposed by Coenen et al. 2017 (Coenen, K., Gallucci, F., Pio, G., Cobden, P., van Dijk, E., Hensen, E. & van Sint Annaland, M. (2017), On the influence of steam on the $CO_2$ chemisorption capacity of a hydrotalcite-based adsorbent for SEWGS applications, *Chemical Engineering Journal*, 314, 554-569) also predicts that a competitive site contributes to the adsorption of $CO_2$. In this study, the competitive site has been incorporated into the adsorption isotherms for both $CO_2$ and $H_2O$. Furthermore, only the adsorption of $CO_2$ and $H_2O$ has been considered. Any other gas species in the syngas mixture are not considered to be adsorbed by the K-promoted hydrotalcite.

adsorption of $CO_2$ and $H_2O$ on K-promoted hydrotalcite, *Chemical Engineering Journal*, 248, 406-414.). For the dispersion terms a second order implicit central differencing scheme applied. The source terms were semi-implicit linearized. Dankwert's boundary conditions applied for the mass and heat balance.

Integration scheme: The now time-dependent ODEs were solved with an Euler forward scheme with time step adaptation. Adaptation of the time step occurs in three cases. Firstly, when the maximum number of iterations occurred to obtain the lowest error. Secondly, if large changes occur between the initial steady-state solution and the current solution. Large changes are defined as the differences between these two states. Thirdly, if the Courant-Friederich-Lewy (CFL) condition, C, becomes higher tan 0, 5, the timestep was adjusted to meet C<0.5. The CFL condition is

TABLE 1

Packed-bed column

| | |
|---|---|
| Continuity: | $\dfrac{\partial \rho}{\partial t} = -\dfrac{\partial \rho v}{\partial z} + \dfrac{1-\epsilon_b}{\epsilon_b} a_p \Sigma_i M_i N_i$ |
| Momentum: | $0 = -\dfrac{\partial p}{\partial z} - f\dfrac{\rho \|u\| u}{d_p}$ |
| Heat balance: | $(\epsilon_b \rho C_p + (1-\epsilon_b)\rho_p C_{p,p})\dfrac{\partial T}{\partial t} = -\rho C_p u\dfrac{\partial T}{\partial t} + \dfrac{\partial}{\partial z}\left(\lambda\dfrac{\partial T}{\partial z}\right) + \dfrac{4U(T_w - T)}{d_c} -$ $(1-\epsilon_b)\rho_p\left((-\Delta H_r)r_{WGS} + \Sigma_i\left(-\Delta H_{a,i}\dfrac{d\langle q_i\rangle}{dt}\right)\right)$ |
| Mass balance: | $\dfrac{\partial(\rho\omega_i)}{\partial t} = \dfrac{\partial \rho v\omega_i}{\partial z} + \dfrac{\partial}{\partial z}\left(D_z\rho\dfrac{\partial \omega_i}{\partial z}\right) + \dfrac{1-\epsilon_b}{\epsilon_b}a_p M_i N_i$ |

TABLE 2

Intra-particle model

| | |
|---|---|
| Mass balance: | $\dfrac{d\langle c_i\rangle}{dt} = k_{LDF,i}(c_{int,i} - \langle c_i\rangle)$ |
| LDF mass transfer coefficient: | $k_{LDF,i} = \dfrac{15\mathcal{D}_{p,i}}{r_p^2\left(\epsilon_p - \rho_p\dfrac{\partial q_i}{\partial c_i}\right)}$ |
| Multicomponent isotherm: | $\langle q_i\rangle = f\left(\langle c_{i...N}\rangle\right)$ |

Numerical Solution Strategy

Boundary conditions: The pressure was defined at the outlet of the column while the feed flowrate is defined at the inlet. The equations were discretized on a uniform grid in the spatial term. To prevent numerical shock problems, a second order flux delimited Barton's scheme for the convective terms was implemented in the code (Centrella, J. & Wilson, J. R. (1984), Planar numerical cosmology II—The difference equations and numerical tests, *The Astrophysical Journal Supplement Series*, 54, 229-249; Goldschmidt, M. J. V., Kuipers, J. A. M., & van Swaaij, W. P. M. (2001), Hydrodynamic modelling of dense gas-fluidised beds using the kinetic theory of granular flow: effect of coefficient of restitution on bed dynamics, *Chemical Engineering Science*, 56(2), 571-578; Boon, J., Cobden, P. D., Van Dijk, H. A. J., Hoogland, C., van Selow, E. V., & van Sint Annaland, M. (2014), Isotherm model for high-temperature, high-pressure calculated according to C=u dt/dz in which dt is the timestep, dz the spatial stepsize, and u the velocity Cyclic simulations: several different cycles were simulated. In the following sections the specific processing parameters and boundary conditions are given. All cycles were simulated in time as an extension of the single column model. Any connecting step in a cycle were temporarily stored in files. As the SEWGS process is a cyclic process, the simulations continues for several cycles until a cyclic steady state is reached. This state is reached when the performance indicators CCR and CP do not change more than 5%. The number of cycles that needs the be simulated depends on the applied conditions for the column. Typically, a minimum of 15 cycles was required.

Data interpretation: For all models a set of performance indicators were determined. For the SEWGS process in general these indicators are the carbon capture and recovery ratio and the $CO_2$ purity. The cycle performance indicated is indicated by the productivity, steam consumption, CO conversion, $CO_2$ adsorption ratio. For all cases $y_i$ and $F_{mol}$ are the integrals over time in given step. The integrals are approximated by the trapezoidal rule.

$$CCR = \frac{\left((y_{CO_2} + y_{CO})F_{mol}\right)_{CO_2\ product}}{\left((y_{CO_2} + y_{CO})F_{mol}\right)_{syngas\ feed}} \quad (3.1)$$

$$CP = y_{CO_2,CO_2\ product} \quad (3.2)$$

-continued $$Prod. = \frac{\left(y_{CO_2}F_{mol}\right)_{CO_2 \; product}}{\text{mass adsorbent} \cdot t_{cycle}} \quad (3.3)$$

$$CO \; conv. = 1 - \frac{(y_{CO}F_{mol})_{CO_2 \; product} + (y_{CO}F_{mol})_{H_2 \; product}}{(y_{CO}F_{mol})_{syngas \; feed}} \quad (3.4)$$

$$CO_2 \; ads. \; ratio = \frac{\left(y_{CO_2}F_{mol}\right)_{H_2 \; product}}{\left(y_{CO_2}F_{mol}\right)_{syngas \; feed}} \quad (3.5)$$

Isobaric System Investigations

Model validation: The model was validated for an isobaric SEWGS process with flowrate of 25 SLPM for the adsorption phase (SEWGS product mixture consisting of 30 mol % $CO_2$, 10 mol % CO, 50 mol % $H_2$, 7 mol % $N_2$ and 3 mol % steam) and 8 SLPM for the purge phase (100% $H_2O$). The duration of the adsorption step was set to 80 s and while the purge step was varied. The process was operated at 3 bar and 400° C.

Parameter study: To evaluate the performance of the isobaric system a parameter study was performed under different operational conditions. In all studies the flowrate, duration, and temperature for each step were the same as for the model validation. The duration of the purge was varied according to when the steam breakthrough occurred in the system. The performance indicators were computed when the system was in cyclic steady state.

Data interpretation: In the isobaric system some additional indicators were determined for further development of the system including recycling streams. Each product stream could be divided into parts. The first part in both adsorption as purge steps could be recycled within the system. The second part of the outflow was the actual product. For the outflow of the adsorption step, the start of the $H_2$ product was defined as $y_{N_2,out}$>0.1. In the purge outflow this was defined as $y_{CO_2,out}$-$y_{CO_2,syngas \; feed}$>0.03.

$$CP_{plug} = y_{CO_2,CO_2 \; plug} \quad (3.6)$$

$$CCR_{plug} = \frac{\left((y_{CO_2} + y_{CO})F_{mol}\right)_{CO_2 \; plug}}{\left((y_{CO_2} + y_{CO})F_{mol}\right)_{syngas \; feed}} \quad (3.7)$$

$$SR = \frac{\left(y_{H_2O}F_{mol}\right)_{steam \; plug}}{\left(y_{H_2O}F_{mol}\right)_{purge \; feed}} \quad (3.8)$$

$$CO_2 \; adsorption \; ratio = \frac{\left(y_{CO_2}F_{mol}\right)_{H_2 \; product} - \left(y_{CO_2}F_{mol}\right)_{steam \; plug}}{\left(y_{CO_2}F_{mol}\right)_{syngas \; feed}} \quad (3.9)$$

Isobaric System

The model validation was performed for the isobaric system with an adsorption step of 25 SLPM and duration of 80 s and a purge with 8 SLPM and 171 s. The performance indicators and transient response were compared between the model and the experiment.

Figure 2:
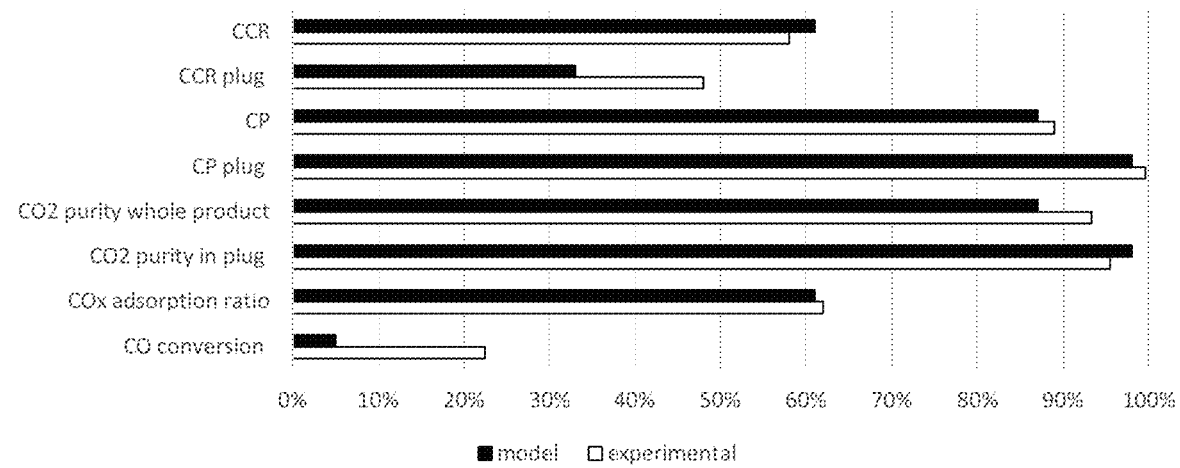
FIG. 2 shows performance indicators for the isobaric SEWGS model system at 3 bar with a flowrate of 25 SLPM and duration of 80 s adsorption step and purge of 171 s with flowrate 8 SLPM, and compares experimental (open bars) versus model (closed bars) data.

A 58% CCR and 89% CP were determined form the experimental data compared to 62% CCR and 87% CP estimated by the model (FIG. 2). In case only the $CO_2$ plug is considered as $CO_2$ product, the CCR decreases to 48% (exp) and 33% (model) while the CP increases to 99.6% (exp) and 98% (model). When only the $CO_2$ plug is considered as $CO_2$ product the CCR decreases, because part of the total carbon fed to the system was emitted before the $CO_2$ plug was emitted, see FIG. 3. The $CO_2$ plug itself has a higher CP value than the whole product from the purge step, since most impurities are present before the $CO_2$ plug occurs.

If only $CO_2$ is considered as carbon species, the model underestimates the $CO_2$ purity in the whole product while overestimating the $CO_2$ purity in the $CO_2$ plug. In the transient response part a CO peak was observed which was not predicted by the model. The presence of CO in the $CO_2$ plug according to the experimental data, causes the CP to be higher in both plug as whole product for the experiment. As the model does not predict the presence of CO in the $CO_2$, the $CO_2$ purity in the plug is estimated to be higher than determined form the experiments. Yet, the $CO_x$ adsorption ratio estimation fits well with the experimental adsorption ratio.

Figure 3:
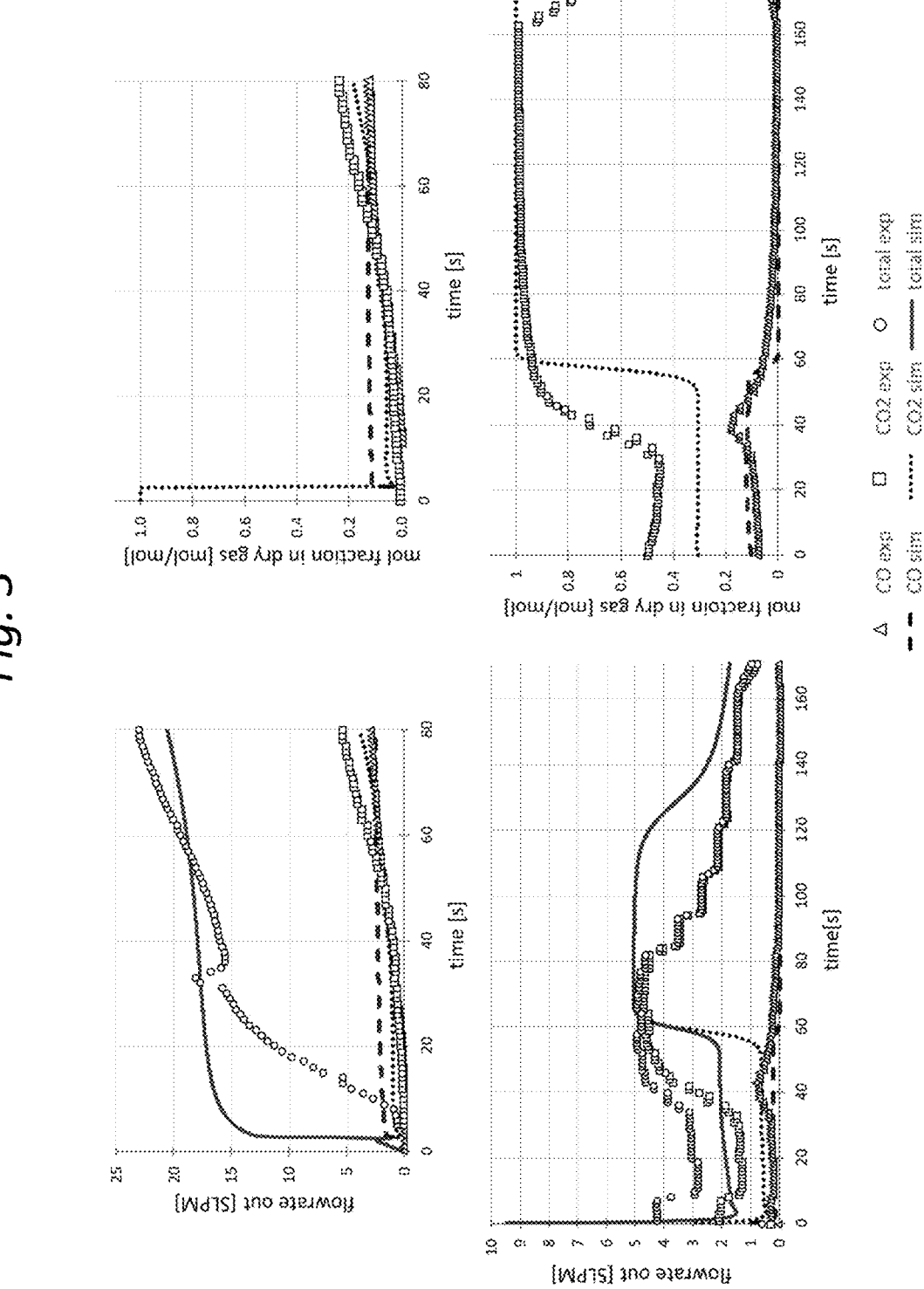
FIG. 3 shows the flowrate (first column) and dry gas phase fraction (second column) for the adsorption (upper row) and purge (lower row) in the isobaric SEWGS system for the experiment (presented by dots) and simulation (dashed lines). The flowrate in the adsorption step was 25 SLPM with a duration of 80 s and the purge step 8 SLPM with 171 s. The legend given applies for all plots. The total in the legend stand for the total dry gas.

Even though the performance indicators are estimated quite well by the model, the predicted transient response has some differences compared to the real transient response. Until 20 s in the adsorption step no carbon species were present in the emission and after 50 s the first difference in molar fraction between CO and $CO_2$ was observed in the experimental data. In contrast, the simulation predicts that in the breakthrough of syngas carbon constantly present in the emission and that until t=50 s the presence of CO is dominant over $CO_2$. Furthermore, the simulation predicts that a small amount of $CO_2$ in the emission is present before breakthrough while no $CO_2$ was observed at the same time moment during the experiment (FIG. 3).

During the purge step, a $CO_2$ roll-up plug is present in the emission with a maximum flowrate of 5 SLPM. Also the molar fraction of $CO_2$ in the $CO_2$ plug is comparable between the experiment and simulation. The model predicts a sharp $CO_2$ front which was also observed in the experiment. However, the $CO_2$ front is predicted later in time than is observed from the experiments. Difference in timing can be caused by the difference in flowrate of the emission at the beginning of the purge. The simulation predicts a lower flowrate than actually observed, because in the experiments a filter is placed on top of the column when the flow direction changes a pressure fluctuation occurs. The larger amount of gas leaving the column than predicted also causes the breakthrough to occur earlier.

From the transient response of the experiments, it was observed that the sorbent adsorbed CO. After 20 s in the adsorption step CO is was monitored in the emission. Before this moment, CO 20 must have been either converted in the WGS reaction to $CO_2$ and the carbon adsorbed as $CO_2$ or CO itself was adsorbed. However, part of carbon in the syngas must have been adsorbed as CO, since in the purge step a small CO plug is observed. It the latter step, $H_2$ was not present in the gas, consequently the observed CO could not have been produced by the reverse WGS reaction which should have produced $H_2$ as well. Therefore, this CO plug must consist of adsorbed CO in the adsorption step.

Investigation of Temperature Effects

Figure 4:
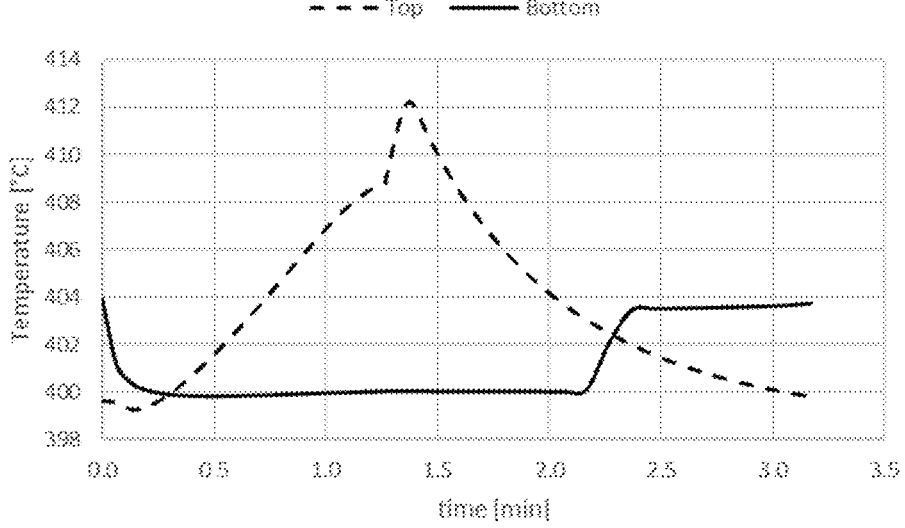
FIG. 4 shows the temperature profiles predicted by the model at the top and bottom of the column.
Figure 5:
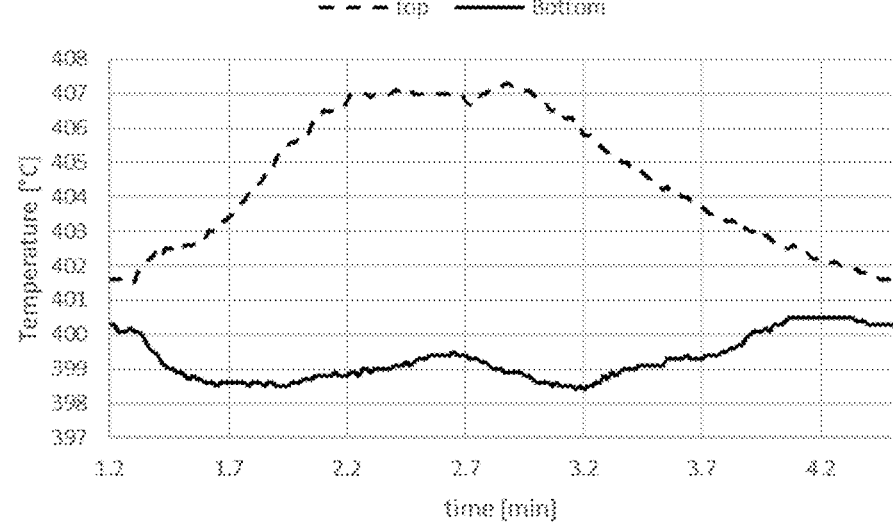
FIG. 5 shows the temperature profiles measured at the top and bottom of the column.

A two-step experimental test was performed using 2 meter high SEWSG reactor column. A feed gas consisting of $CO_2$ (30 mol %), CO (10 mol %), $H_2$ (50 mol %), $H_2O$ (3 mol %) and an inert gas (7 mol %) was co-currently fed (top-down) at a feeding rate of 25 Standard liters per minute (SLPM) for 80 s. Then, a 100% $H_2O$ purge was fed at a rate 8 SLPM counter-currently for 113 seconds. Thermocouples were used to measure the temperature along the height of the column. The temperature profile of the column was simulated using modelling and measured experimental, and the results are shown in FIGS. 4 and 5 respectively. These trends show that temperature profiles throughout the column can be used to infer the position of the adsorption front.

The invention claimed is:

1. A process for the separation of a gas mixture containing $CO_2$ and at least one inert gaseous species into a $CO_2$ product stream and an inert product stream, comprising:

(a) feeding the gas mixture into an adsorption column via a first inlet located at a first side of the column, wherein the adsorption column contains hydrotalcite as a solid $CO_2$ sorbent loaded with $H_2O$ molecules and thereby desorbing $H_2O$ molecules and adsorbing $CO_2$ molecules, to obtain a sorbent loaded with $CO_2$ and the inert product stream; and then (b) feeding a stripping gas comprising $H_2O$ into the adsorption column via a second inlet located at a second side which is opposite to the first inlet, thereby stripping the sorbent and desorbing $CO_2$ molecules and adsorbing $H_2O$ molecules, to obtain a sorbent loaded with $H_2O$ and the $CO_2$ product stream, wherein the adsorption column is re-used in step (a) after being stripped in step (b) and wherein the process is performed at a temperature in the range of 200-500° C.

2. The process according to claim 1, wherein the steps (a) and (b) are performed at a pressure in the range of 1 to 50 bar, wherein the pressure during the process varies for at most 1 bar, wherein the temperature during the process varies for at most 40° C.

3. The process according to claim 1, wherein two or more adsorption columns operate in parallel, wherein at least one is performing step (a) and at least one is simultaneously performing step (b).

4. The process according to claim 1, wherein downstream of step (a) inert gaseous molecules are separated from the inert product stream.

5. The process according to claim 1, wherein the pressure during the process varies for at most 0.3 bar, and/or wherein the temperature during the process varies for at most 10° C.

6. The process according to claim 1, wherein the inert gaseous species do not adsorb to the adsorption column at the process conditions.

7. The process according to claim 6, wherein the inert gaseous species is selected from $H_2$, $N_2$, $CH_4$ and other hydrocarbons.

8. The process according to claim 1, wherein the gas mixture that is fed during step (a) is a product mixture from a water gas shift process containing at least $CO_2$ and $H_2$.

9. The process according to claim 1, wherein the process is performed at a temperature in the range of 300-500° C.

10. The process according to claim 4, wherein downstream of step (a) inert gaseous molecules are separated from the inert product stream by condensation of $H_2O$.

*    *    *    *    *